United States Patent [19]

Seger

[11] E Patent Number: Re. 33,053

[45] Reissued Date of Patent: Sep. 12, 1989

[54] LOW NOISE VALVE

[75] Inventor: Fritz O. Seger, Mission Viejo, Calif.

[73] Assignee: Cameron Iron Works USA Inc., Houston, Tex.

[21] Appl. No.: 194,547

[22] Filed: May 16, 1988

Related U.S. Patent Documents

Reissue of:

[64] Patent No.: 4,549,718
Issued: Oct. 29, 1985
Appl. No.: 607,521
Filed: May 7, 1984

[51] Int. Cl.[4] ..... F16K 47/04

[52] U.S. Cl. ..... 251/121; 251/123; 137/625.3

[58] Field of Search ..... 251/121, 126, 127, 123, 251/124; 137/625.3

[56] References Cited

U.S. PATENT DOCUMENTS

| | | | |
|---|---|---|---|
| 525,462 | 9/1894 | Jones . | |
| 3,059,894 | 10/1962 | Knecht et al. | 251/121 |
| 3,240,124 | 3/1966 | Howard et al. . | |
| 3,252,480 | 5/1966 | Odendahl et al. | 137/625.3 |
| 3,324,890 | 6/1967 | Whitmore et al. . | |
| 3,460,577 | 8/1969 | Weathers . | |
| 3,485,474 | 12/1969 | Baumann | 251/121 |
| 3,637,188 | 1/1972 | Ung . | |
| 3,715,098 | 2/1973 | Baumann | 251/121 |
| 3,730,479 | 5/1973 | Baumann | 251/121 |
| 3,807,454 | 4/1974 | Westveer . | |
| 3,812,883 | 5/1974 | Yokokawa . | |
| 3,880,399 | 4/1975 | Luthe | 251/121 |
| 3,948,479 | 4/1976 | Bedo et al. | 251/121 |
| 3,990,549 | 11/1976 | Sisson et al. . | |
| 4,044,834 | 8/1977 | Perkins | 166/314 |
| 4,049,235 | 9/1977 | Singleton . | |
| 4,122,868 | 10/1978 | Holloway et al. . | |
| 4,155,535 | 5/1979 | Seamone . | |
| 4,249,455 | 2/1981 | Kervagoret . | |
| 4,363,464 | 12/1982 | Spils | 251/121 |

FOREIGN PATENT DOCUMENTS

| | | | |
|---|---|---|---|
| 855010 | 11/1970 | Canada . | |
| 2018776 | 10/1971 | Fed. Rep. of Germany | 251/121 |
| 709046 | 5/1954 | United Kingdom . | |
| 1011820 | 12/1965 | United Kingdom . | |
| 1283950 | 8/1972 | United Kingdom . | |

*Primary Examiner*—Arnold Rosenthal
*Attorney, Agent, or Firm*—Christie, Parker & Hale

[57] ABSTRACT

A low-noise valve has a body with a fluid inlet to receive pressurized fluid, an oulet and a fluid passageway extending between the inlet and outlet. Located in the passageway are a number of spaced throats. The valve also includes a movable stem with a number of plugs each adapted to be closely received by a corresponding throat. Each plug includes a plurality of circumferential alternating grooves and lands, the lands being closely spaced within the throats to create a plurality of flow restrictions each incrementally restricting fluid flow when the stem is at a minimum flow position. Movement of the stem toward a full open position sequentially removes the lands from the throat to reduce restriction of said fluid flow in stages.

11 Claims, 4 Drawing Sheets

LOW NOISE VALVE

Matter enclosed in heavy brackets [ ] appears in the original patent but forms no part of this reissue specification; matter printed in italics indicates the additions made by reissue.

*This application is a reissue of Ser. No. 06/607,521, filed May 7, 1984, now U.S. Pat. No. 4,549,718.*

FIELD OF THE INVENTION

This invention relates to choke valves and more particularly choke valves which avoid cavitation at high pressure drops and have control of flow over a broad range of flow rates.

BACKGROUND OF THE INVENTION

In some processes it is necessary to provide a valve to choke fluid flow within a range between one extreme of a high flow rate with a low pressure drop across the valve to the other extreme of a low rate with a high pressure drop. One example of such a process is secondary recovery of oil from an arctic oil field. A high pressure fluid, usually water, is pumped down one or several wells to drive the oil to one or several production wells where the oil is recovered and lifted to the surface.

To practice the above method of secondary recovery, the water should be pumped into the well at a high flow rate to fill the well and formation as quickly as possible. In the event of a power failure or other operational shut-down, it is necessary to throttle fluid flow to a lower flow rate due to the limited capacity of the standby pump to maintain at least some flow to prevent the water from freezing in the wells or the supply lines. To control secondary recovery, the flow of water into the formation may also have to be controlled to a rate between the high and low flow rates.

The rangeability of prior art choke valves, i.e., the ability to choke in a range from a high flow rate with a low pressure drop across the valve to a low flow rate with a high pressure drop, has been found to be insufficient for certain processes including the secondary recovery method set forth above. Typically the rangeability of known choke valves, expressed in the ratio of the flow coefficient (hereinafter referred to simply as $C_v$) of the valve at the high flow rate condition to $C_v$ at the low flow rate condition, has fallen between 30:1 to 60:1. $C_v$ is a function of the flow area at the throat of the choke valve as determined by testing. In the secondary recovery process described above, the water injection control valve may be required to have a rangeability of 340:1. Accordingly it can be understood that prior art choke valves do not have the rangeability demanded for some applications, in particular, water injection for secondary recovery.

While it has been known to use choke valves having insufficient rangeability, such use results in several problems. Since prior art choke valves have a single throat and plug to choke flow, the required variation of flow area to achieve the desired rangeability may result in high fluid velocities. This, in turn, results in cavitation. Cavitation usually occurs at the low flow, high pressure drop end of the control range and produces valve noise. Along with creating noise, cavitation also results in damage to the valve components such as the valve throat and the plug. Accordingly, there is a need for a valve having sufficient rangeability to be suitable for applications such as water injection secondary recovery without causing valve noise and cavitation.

SUMMARY OF THE INVENTION

There is, therefore, provided in the practice of this invention a low noise valve having a housing with a fluid inlet and a fluid passageway leading through the housing to a fluid outlet. The housing includes a plurality of valve throats disposed in the passageway. The valve also includes a valve stem having a plurality of plugs, the stem being movable between a first position wherein the plugs are each closely spaced within a respective throat for fully choking fluid flow to a second, full open, position wherein the plugs are remote from the throats. Each plug has outer alternating grooves and lands, the lands being adapted to be closely spaced within the throat when the stem is in the first position to fully choke fluid flow and pass a small quantity of fluid with a very high pressure drop. As the stem is moved to the second full open position the lands of each plug are sequentially removed from the throat to pass a greater quantity of fluid and reduce choking of the flow. In the preferred embodiment, four throats and plugs are provided, each plug having six grooves alternating with seven lands to, in effect, provide the low noise valve with 28 stages with which to control fluid flow. Alternatively, the throat may be provided with the alternating grooves and lands adapted to control fluid flow and give the low noise valve the desired rangeability.

BRIEF DESCRIPTION OF THE DRAWINGS

These and other features and advantages of the present invention will be appreciated as the same becomes better understood by reference to the following detailed description of the presently preferred embodiments when considered in connection with the accompanying drawings wherein.

DETAILED DESCRIPTION

Figure 1:
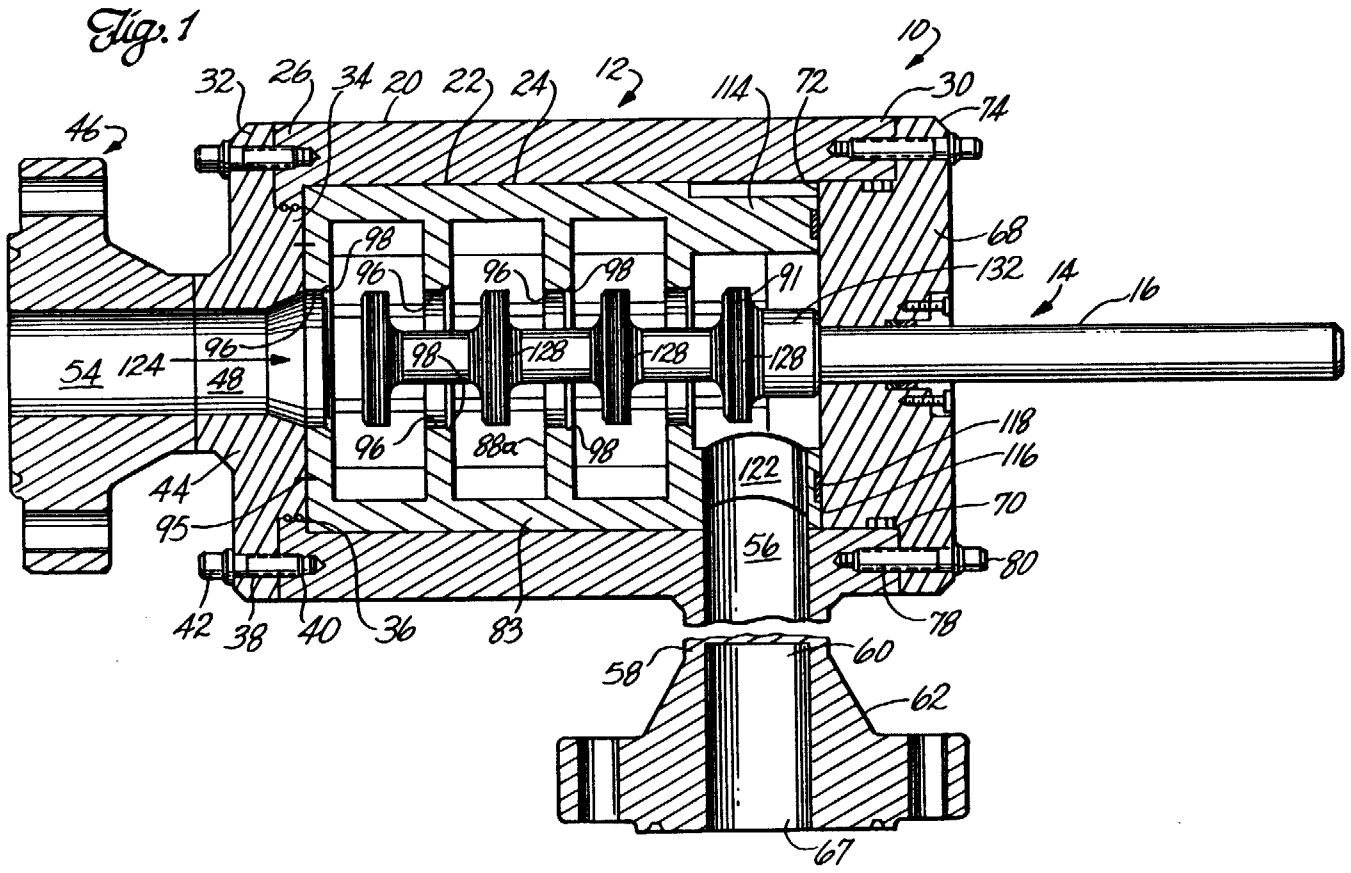
FIG. 1 is a partial section view of the valve in the full open position.
Figure 2:
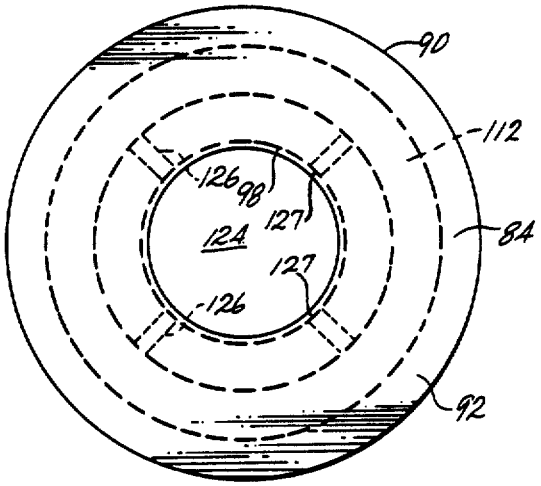
FIG. 2 is an end view of the cage for the valve of FIG. 1.

Turning to the drawings, FIG. 1 shows a choke valve 10 according to the present invention. In the secondary recovery of oil from an oil field, one method, and the method for which the valve 10 is directed, by which additional oil may be liberated from a well is to inject a high pressure fluid such as water down one or more injection wells into the oil field. The valve 10 is disposed in a pumped water supply line and is required to have a discharge in a range of fluid flows and pressures. For an example, to quickly fill the field, water should be injected at a high flow rate and at a high pressure on the order of several thousands of gallons per minute and several thousands of pounds per square inch. This condition, hereinafter referred to as full open, represents one end of the range for the valve 10. In areas subject to freezing conditions such as the arctic, the flow rate and pressure may have to be controlled to prevent the water from freezing in the water lines. For example, for arctic oil fields, should a power failure or other shutdown occur the injection water must be kept moving to prevent freezing within the piping. Accordingly, diesel operated pumps supply water through the valve 10 which is modulated to choke the flow down to a flow of tens of gallons per minute and a discharge pressure of about 350 pounds per square inch. This condition, hereinafter referred to as the minimum flow condition, represents the other end of a required range of the valve 10. To properly move the oil in the field from the vicinity of the injection wells, the valve 10 is required to operate at full open, minimum flow or at selected intermediate conditions.

As a specific, but not limiting example, the valve 10 may receive water from a pumped supply at 1750 gpm and at or about 2300 psi. In the full open condition, a valve 10 will have a discharge of 1750 gpm at or about 2000 psi, the pressure differential across the valve 10 being at a minimum of about 300 psi at this end of the range. At the minimum flow condition, at the other end of the range, the valve 10 is adapted to have a discharge of only about 23 gpm at or about 350 psi. Of course, it is to be understood that the discharge pressure of the valve 10 and the overall pressure differential across the valve 10 depends upon many factors such as the supply pump operating curve and the back pressure of the formation.

The rangeability of the valve 10 under the above conditions requires that it have a flow coefficient rangeability of about 340:1. Valves heretofore found in the prior art have not had sufficient rangeability to permit operation under the above-described conditions or are substantially more expensive to build.

The valve 10 includes a housing 12 and a movable valve stem shown generally as 14. The stem has a shaft 16 extending into the housing 12 and is adapted at one end to be connected to an actuator (not shown) which may be pneumatic or the like.

The housing 12 has a cylindrical body 20 with an inner wall 22 defining a cylindrical chamber 24. At opposite ends the body 20 has an inlet end 26, and a bonnet end 30.

Secured to the inlet end 26 is an inlet flange 32. The inlet flange 32 has an outer diameter substantially equal to that of the body 20 and includes a coaxially projecting cylindrical boss 34 adapted to be closely received by the inner wall 22 of the body 20. One or several O-rings 36 or similar seals are disposed between the boss 34 and the inner wall 22 to prevent fluid from leaking from the chamber 24 around the inlet flange 32. Bolts 42 pass through the inlet flange 32 into the body inlet end 26 to attach the inlet flange 32 to the body 20. Opposite the boss 34, the inlet flange 32 also includes a frustoconical head 44 adapted to mount an inlet fitting 46 to the housing 12. The inlet fitting is adapted to connect the valve 10 to the supply piping. Passing axially through the inlet flange 32 is a bore defining an inlet 48 for the valve 10. A supply bore 54 passing axially through the inlet fitting 46 to register the inlet 48 to admits pressurized fluid the valve 10.

To provide a discharge for the valve 10, the housing and more particularly the body 20 includes a radial bore near the bonnet end 30 defining an outlet 56. To enable discharge piping to be connected to the valve 10 and to the outlet 56, a frustoconical outlet flange 58 is connected to the body 20 as by welding. The outlet flange 58 includes an axial bore 60 of the same diameter as and adapted to register with the outlet 56.

To facilitate connecting the valve 10 to the discharge piping, an outlet fitting 62 of a shape similar to that of the inlet fitting 46 is connected to the outlet connection 58. An axial bore 67 passes through the outlet fitting 62 and registers with the outlet 56 to pass fluid into the discharge piping.

To close the chamber 24 and support the shaft 16, the housing 12 includes a bonnet 68 secured to the bonnet end 30. The bonnet 68 has an outer diameter to be closely received into the chamber 24 and includes one or several circumferential grooves adapted to receive "O" rings 70 or similar seals to seal the bonnet 68 against the inner wall 22 of the body 20. At one end, the end disposed within the chamber 24, the bonnet 68 has a face 72 arranged in a plane transverse to the axis of the chamber 24. At the other end, the bonnet 68 has a radially outward projecting flange 74 to receive bolts 80 to interconnect the bonnet 68 and barrel 20.

To cooperate with the valve stem in the manner described in detail below to give the valve 10 the required rangeability, a cage 82 is disposed in the chamber 24. The cage 82 has an outer cylindrical shell 83 adapted to be closely received into the chamber 24. Positioned at axial intervals within the shell 83 are radial first through fourth annular disks 84, 86, 88 and 90, respectively. The first disk 84 defines a closed end for the shell 83 and abuts the boss 34 to restrain axial movement of the cage 82. To prevent the first cage 82 from rotating within the chamber 24 pins 95 are interposed between the boss 34 and the first disk 84.

To pass fluid from the inlet 48 toward the outlet 56, the first disk 84 includes an axial bore defining a throat 96. The throat 96 is substantially the same diameter as the inlet 48 and includes an annular face groove 98 projecting radially outward where the throat 96 exits the first disk 84.

The second disk 86 is spaced downstream, i.e., to the right as seen in FIG. 1, from the first disk 84 and similarly radially spans and partitions the shell 84 To pass fluid therethrough, the second disk 86 includes an axial bore defining another throat 96 identical to the first disk throat 96. The second disk throat 96 has a face groove 98 where the throat 96 exits the second disk 86.

By providing the face grooves 98, the distance between the throats of the first disk 84 and second disk 86 and the remaining throats can be closely determined by machining the face cuts 98 subsequent to manufacture of the cage 82 which may be *a* casting. Since the [the] initial spacing of the disks and their throats may vary, by machining face groove 98 subsequent to assembly, throat spacing can be precisely determined.

The third disk 88 is identical to the second disk 86 including another throat 96 with a face groove 98.

The fourth disk 90 is similar to the second and third disks 86 and 88 to radially span and partition the shell and includes an axial bore defining a fourth throat 96. Like the throats described above, the fourth disk throat 96 has a face groove 98.

To position the cage 82 in the chamber 24 so that the first disk 84 abuts the inlet connection 32 and to support the cage against the bonnet end 30, the cage 82 includes a cylindrical base 114. The base 114 projects from the fourth disk 90 to have an end defining a face 116 adapted to abut the cap face 72 to support the cage 82 when it is disposed in the chamber 24. An annular groove 118 is disposed about the face 116 to receive a gasket 120 which acts as a cushion to prevent the cage from rattling within the chamber under the influence of flow turbulence. Extending radially outward through the base 114 to register with the outlet 56 is a cage bore 122 which has substantially the same diameter as the outlet 56. By virtue of the pins 95, the cage bore 122 remains aligned with the outlet 56.

To guide the movement of the valve stem 14, the cage 82 includes ribs 126 disposed at 90° within the shell 83. The ribs 126 extend axially within the shell between the disks to define four tracks 127 extending from the first disk 84 to a point about half the thickness of the base 114 beyond the fourth disk 90. The ribs 26 function to support the stem 14 between the minimum flow and full open position.

As can be appreciated from the drawings, the shell 83, throats 96, base 114 and cage bore 122 define a fluid passageway 124 extending from the inlet 48 to the outlet 56.

To cooperate with the throats 96 to control fluid flow and give the valve 10 the desired rangeability of 340:1, the stem 14 has four equally spaced plugs 128 disposed at the end and along the shaft 16.

Figure 4:
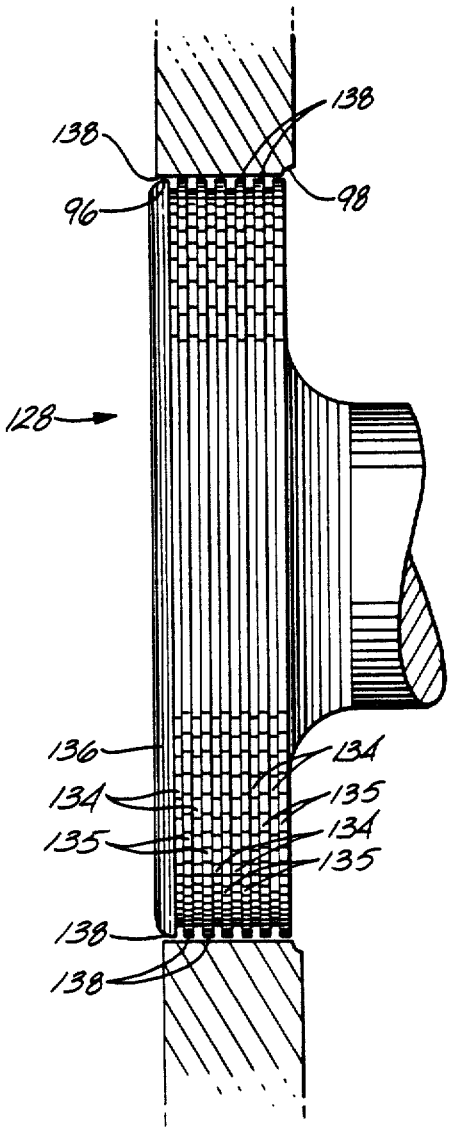
FIG. 4 is a partial section view similar to that of FIG. 3 showing the valve in an intermediate position between full open and full choked.

The plugs 128 are cylindrical, each adapted to be received in a closely spaced relationship in a throat 96 when the valve 10 is at a minimum flow conditions as shown in FIG. 4. Disposed circumferentially about each plug 128 are a plurality of grooves 134. Preferably, as shown in the drawings, each plug 128 has six such grooves 134. However, it should be noted that the number of grooves may be increased or decreased from the six shown and hereinafter described as desired. The grooves 134 are equally spaced from one another and from the downstream end, i.e., the right end as shown in the drawings, to define seven lands 135. The upstream side land 135 of each plug has a rounded leading edge 136. The leading edge 136 reduces wear on the plug and guides the plug to smoothly enter the designated throat. The lands 135 represent the outer perimeter of the plug 128 and accordingly are adapted to be closely spaced within the first throat 96 when the valve 10 is at the minimum flow condition.

In addition to the plugs 128 a cylindrical stop 132 is located about the shaft 16 to abut the cap 68 when the stem 14 is at full open.

For a 4-inch valve the cage 82 has an axial length of about 9.99 inches, the throats 96 being axially spaced apart by 2.125 inches. Each throat 96 has a diameter of 2.506 inches and an axial length of 0.500 inches, including the face cut 98 which has an axial length of about 0.090 inches. Each plug 128, to cooperate with the throats 96, has an outer diameter of 2.4995 inches with an overall axial length of 0.469 inches. The upstream end of each plug leading edge 136 is spaced from the upstream end of an adjacent plug leading edge 136 by 2.125 inches. The grooves 134 are 0.032 inches in axial length and 0.032 inches in radial depth and are spaced from the downstream end of each plug 128 to define the lands 135 having an axial length of 0.032 inches. The leading edge 136 and adjacent land 135 have a combined axial length of 0.070 inches.

When the valve 10 is at minimum flow, the plugs 128 are disposed within the throats 96 as shown at FIG. 4. The smaller diameter plugs 128 close the throats 96 to each define an annular flow area of about 0.0216 square inches representing the space between the plug lands 135 and the throat wall. Manufacturing tolerance variations in the throat 96 or plug 128 may alter the radial width of the restriction to a range of about 0.002 to 0.0035 inches influencing the flow area accordingly. As can be appreciated, the annular flow area defined restriction is about 0.44 percent of the area of the throat.

As can be appreciated the seven lands 135 of each plug, with the interposed grooves 134, create, in effect, seven discrete annular fow restrictions 138 in each throat 96. The fluid flowing from the inlet 48 toward the outlet 56 must flow through the seven annular flow restrictions 138 defined in each throat 96. In so doing, each flow restriction 138 incrementally restricts fluid flow. Contrasted with typical prior art choke valves which rely upon a single stage to control fluid flow, the annular flow restrictions of the valve 10 according to the present invention provides numerous stages, each incrementally restricting fluid flow. Accordingly, no individual stage is required to control fluid flow to such an extent that the pressure drop approaches the value $K_c$. $K_c$ is the cavitation index of a valve configuration which, when compared with the value of $\Delta P/P_1-P_v$, indicates the presence of cavitation. $\Delta P$ is the pressure drop of each stage, $P_1$ is the inlet pressure absolute and $P_v$ is vapor pressure of the liquid. When $\Delta P/P_1-P_v$ is greater than $K_c$, cavitation is present; when $\Delta P/P_1-P_v$ is less than $K_c$, cavitation is absent or minor.

The valve 10, as shown in the drawings, has four plugs, each having seven lands which cooperate to define 28 flow restrictions overall for the valve 10 when at the minimum flow position. In the illustrated embodiment, valve 10 is capable of controlling fluid from an initial flow rate and pressure of 1750 gpm and about 2300 psi to a flow rate and pressure of about 23 gpm and 300 psi. As discussed above, the pressure reduction is accomplished in $4\times7$ steps, thus avoiding cavitation by virtue of the incremental flow restrictions. Accordingly, the valve 10 is well suited to maintain a small flow rate through the associated piping to prevent freezing in arctic environs.

Figure 3:
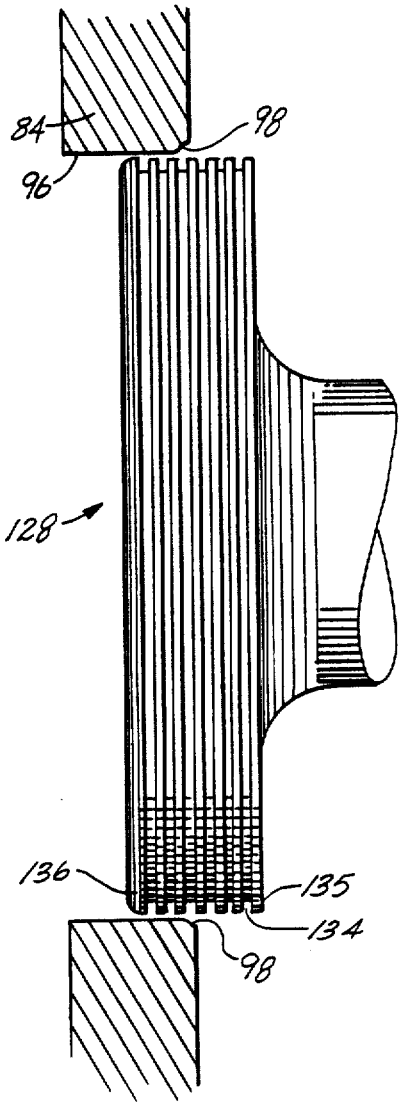
FIG. 3 is a partial section view of the valve shown in the full choked position.

To increase the fluid flow through the valve 10, the shaft 16 is moved toward the full open position which is illustrated in FIG. 1. As the plugs 128 are displaced from the throats 96, the downstream land 135 of each plug is positioned such that the upstream adjacent groove 134 registers with the face groove 98. In this position the flow restriction 138 created by the land 135 disposed within the throat 96 is removed from being effective as a restriction. In view of the similarity of the position of the plugs 128 relative to the throats, restricting flow is initially reduced by four stages as the downstreammost land 135 of each plug 128 is displaced from its respective throat 96. Continued movement of the stem 14 displaces another land 135 of each plug 128 from its respective throat 96 to reduce the restriction by four more stages. At an intermediate position, as shown in FIG. 3, four lands 135 of each plug 128 have been displaced from the throat leaving, accordingly, three flow restrictions 138 per throat for a total of twelve flow restrictions 138 all together. Therefore, as shown in FIG. 3, flow is controlled by 12 stages as compared to 28 stages at minimum flow. It follows that in the position as shown in FIG. 3, the valve 10 will have a flow rate substantially greater than when the valve 10 is at minimum flow. As the shaft 16 is further displaced, the restricting effect is reduced by four-stage increments until the stem 14 is at full open. At full open the illustrative 4-inch valve 10 is adapted to pass 1750 gpm with a discharge pressure of about 2000 psi, the pressure drop across the valve 10 being a minimum.

It is to be noted that the area of annular space between the outside of the plugs and the inside of the sleeves 112 is preferably at least as large as the annular flow area between the throats and the shaft 14 to minimize pressure drop when the valve is fully open.

Figure 5:
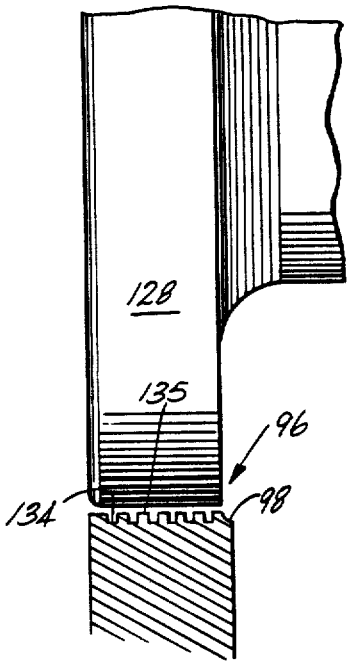
FIG. 5 is a partial section view similar to FIG. 3 showing a further embodiment of the present invention.
Figure 6:
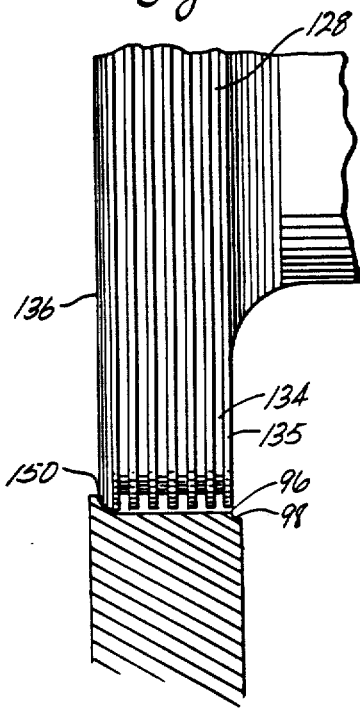
FIG. 6 is a partial section view similar to FIG. 3 showing yet another embodiment of the present invention.

While I have shown and described certain embodiments of the choke valve 10, it is to be understood that it is subject to modification without departing from the scope and spirit of the following claims. For example, rather than fashioning the grooves in the plugs, the grooves could be disposed in the throat walls, the plug having a smooth circumference as shown in FIG. 5. Also, a seat 150 could be fashioned at the upstream edge of the throat nearest the inlet to the seat the leading edge 136 of the corresponding plug to provide for complete stoppage of fluid flow as shown in FIG. 6. Furthermore, the number of plugs and hence the number of throats may vary from case to case depending upon $\Delta P/P_1 - P_v$ at full open conditions. Additionally, it should be noted that the valve 10 may be reversed such that the fluid enters the outlet and is discharged through the inlet.

What is claimed is:

1. A low noise valve comprising:

a body having a fluid inlet and a passageway extending from the inlet to a fluid outlet, the body including a plurality of throats serially disposed in the passageway; and a valve stem movable between a first position wherein a plug having a plurality of outer alternating grooves and lands is positioned within each throat to define a plurality of annular flow restrictions between the throat and the plug lands to restrict fluid flow from the inlet to the outlet and a selected second position wherein at least one land of each plug is disposed without the throat to reduce the number of annular flow restrictions restricting fluid flow.

2. The valve of claim 1 wherein the radial area of each flow restriction is about 0.44 percent of the area of the throat.

3. The valve of claim 1 wherein the plug has seven lands alternating with six grooves.

4. The valve of claim 1 further including a cage disposed in the housing, the cage including a shell having a plurality of spaced members each with a bore defining one of said throats and further including a rearwardly outwardly projecting face groove in each member adjacent the throat, said face groove cooperating to separate each throat from adjacent throats a desired amount.

5. A low noise valve comprising:

a body having an inlet to admit pressurized fluid, an outlet for the fluid to be discharged from the body, and a passageway communicating between the inlet and outlet, said body including a plurality of serially arranged cylindrical throats; and a stem movably disposed in the body, the stem including a plurality of cylindrical plugs each having alternating circumferential grooves and lands, the stem movable between a minimum flow position wherein a plug is disposed in and the lands are closely spaced from each of the throats to restrict fluid flow to a full open position wherein the plugs are remote from said throats, movement of the stem from the first to the second position sequentially displacing said lands from said throats to reduce the restriction.

6. The valve of claim 5 wherein the body includes four throats spaced within the passageway and the stem includes four plugs each adapted to be disposed in a corresponding throat to restrict fluid flow in a number of incremental stages, the number of stages equal to the total number of lands on all plugs when the stem is at the minimum flow position.

7. The valve of claim 6 wherein each plug includes circumferential grooves alternating with six circumferential lands to effect a pressure drop from the inlet to the outlet in 28 stages.

8. A low noise valve comprising: a body having an inlet to admit pressurized fluid, an outlet for the fluid to exit the body and a passageway communicating between the inlet and outlet, said body including a plurality of throats; and a stem movably disposed in the body, the stem including a plurality of plugs each adapted to be received by a throat, one of said plugs and throats including a plurality of alternating grooves and lands defining a plurality of flow restrictions to restrict the fluid flow when said stem is at a minimum flow position, said flow restrictions becoming sequentially ineffective to restrict fluid flow as said stem is moved toward a full open position wherein said plugs are remote from said throats.

9. The valve of claim 8 further including a cage disposed in the body, the cage having a shell with a plurality of members disposed generally transverse to fluid flow, each of such members having an axial bore defining one of said throats, and a face groove adjacent the downstream terminus of each throat, the face groove of each throat having an axial length to, in cooperation with the face grooves of other adjacent throats, space the throats a selected amount from one another.

*10. The valve of claim 8 wherein the alternating lands and grooves are on the throats and the respective plugs each have a smooth cylindrical circumference.*

*11. The valve of claim 8 wherein the alternating lands and grooves are on the plugs, and the respective throats each have a smooth cylindrical circumference.*

* * * * *